Sept. 4, 1956  G. R. BROWNLEE ET AL  2,761,578
SELF-LOADING AND UNLOADING BALE WAGON
Filed April 20, 1955  3 Sheets-Sheet 2
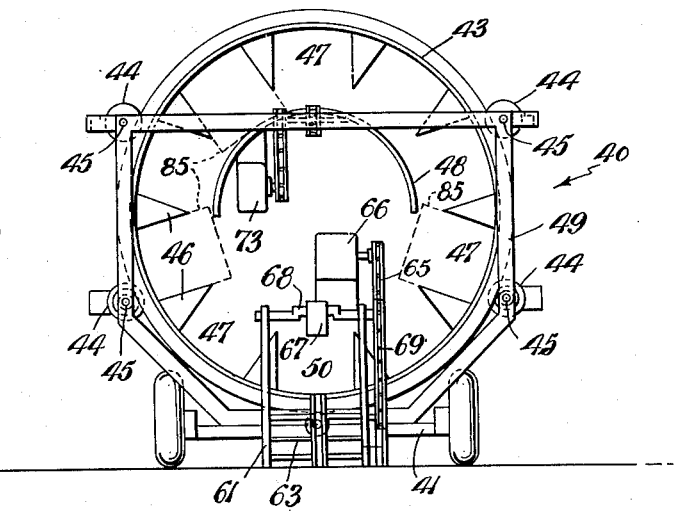
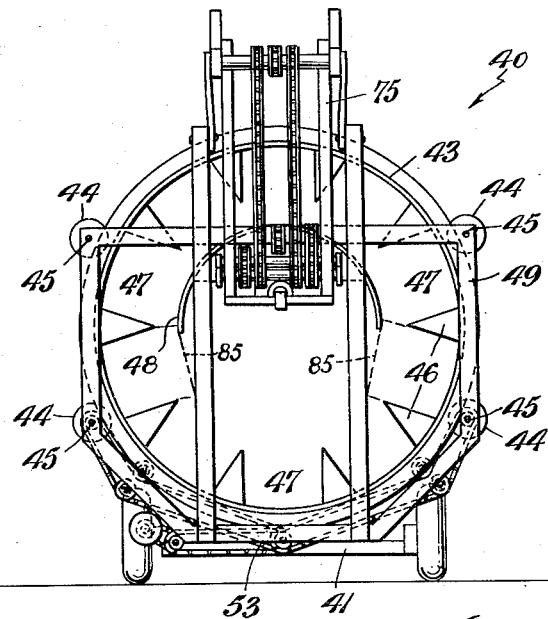
INVENTOR
George R. Brownlee,
and Donald J. Brownlee.
BY  Murray H. Lane.
ATTORNEY

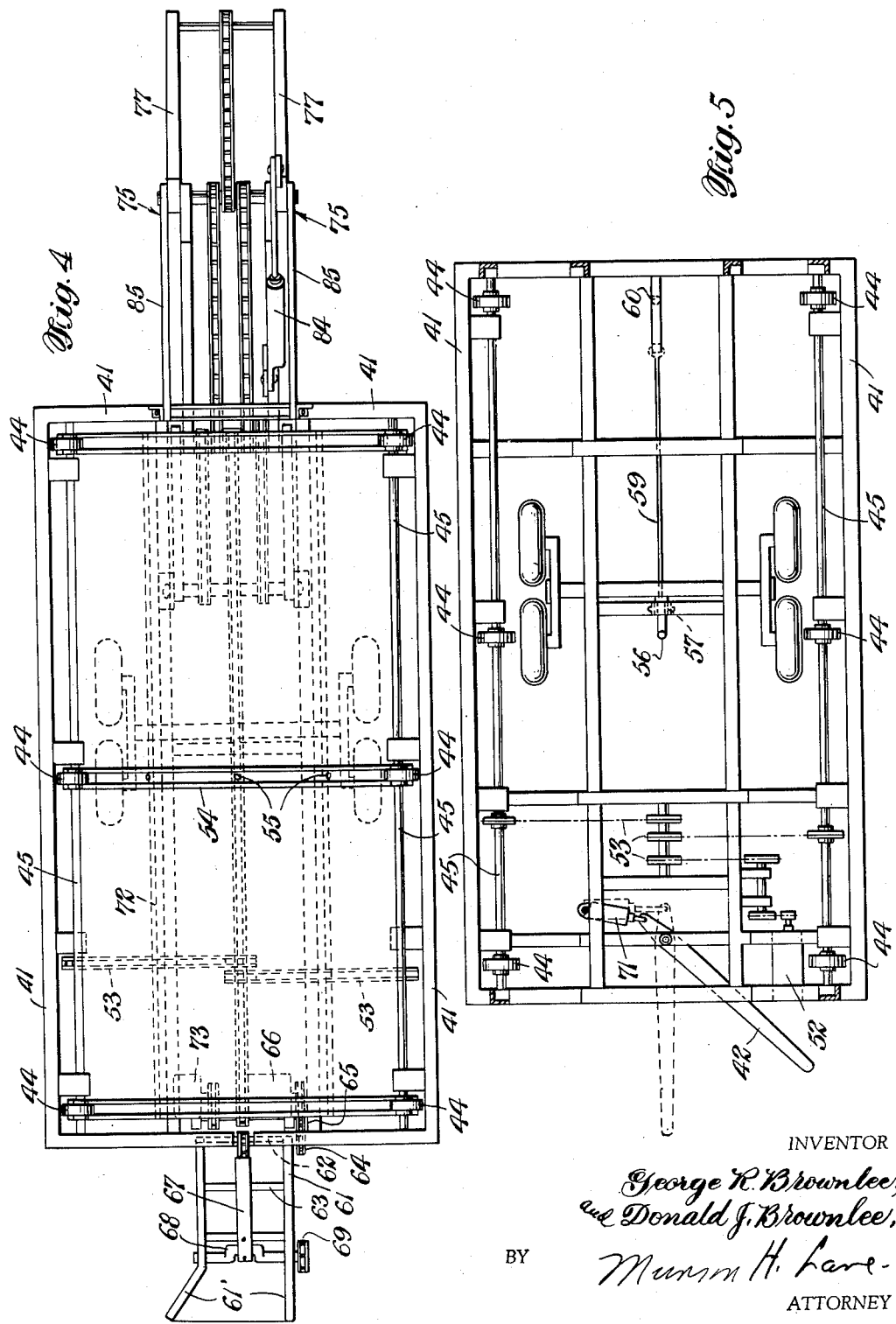

United States Patent Office 2,761,578
Patented Sept. 4, 1956

2,761,578

SELF LOADING AND UNLOADING BALE WAGON

George R. Brownlee and Donald J. Brownlee,
Sylvia, Kans.

Application April 20, 1955, Serial No. 502,698

5 Claims. (Cl. 214—507)

This invention relates to new and useful improvements and structural refinements in wagons for transporting baled material such as hay, straw, and the like, and the principal object of the invention is to substantially minimize the time and effort required for the loading and unloading of such wagons.

In common practice, a flat bed wagon is usually attached to the rear of an agricultural baler so that bales discharged by the latter may be stacked manually on the bed of the wagon. Moreover, if a wagon does not accompany the baler, the bales are discharged on the ground and subsequently must be picked up and deposited on the wagon for purposes of transportation.

The instant invention eliminates the aforementioned disadvantages by the provision of a wagon having a drum-type magazine equipped with compartments adapted to receive bales directly from the baler, or to pick them up off the ground, as preferred, this operation being accomplished in a systematic fashion without undue loss of time and effort, while the discharging or unloading of the bales from the wagon is effected with equal expedition.

An important feature of the invention resides in the provision of a bale wagon with a compartmented, drum-type magazine for the accommodation and storage of bales therein, together with automatic, power actuated means for rotating the magazine structure so that the bales in the various compartments thereof may be successively brought in alignment with bale loading and unloading stations in the magazine.

Another important feature of the invention involves the provision of power actuated conveyors for loading and unloading the bales in the magazine, such conveyors being projectably and retractably mounted so that they are inobstructive when not in use.

Some of the advantages of the invention lie in its simplicity of construction, in its efficient operation, in its durability and in its adaptability to economical manufacture.

With the above more important objects and features in view and such other objects and features as may become apparent as this specification proceeds, the invention resides in the details of construction and arrangement of parts, substantially as shown in the accompanying drawings, wherein like characters of reference are used to designate like parts and wherein:

Figure 2 is a front end view of the device shown in Figure 1;

Figure 3 is a rear end view thereof;

Figure 4 is a top plan view of the same; and

Figure 5 is a top plan view of the chassis of the wagon, with the drum-type magazine removed for illustrative purposes.

Figure 1:
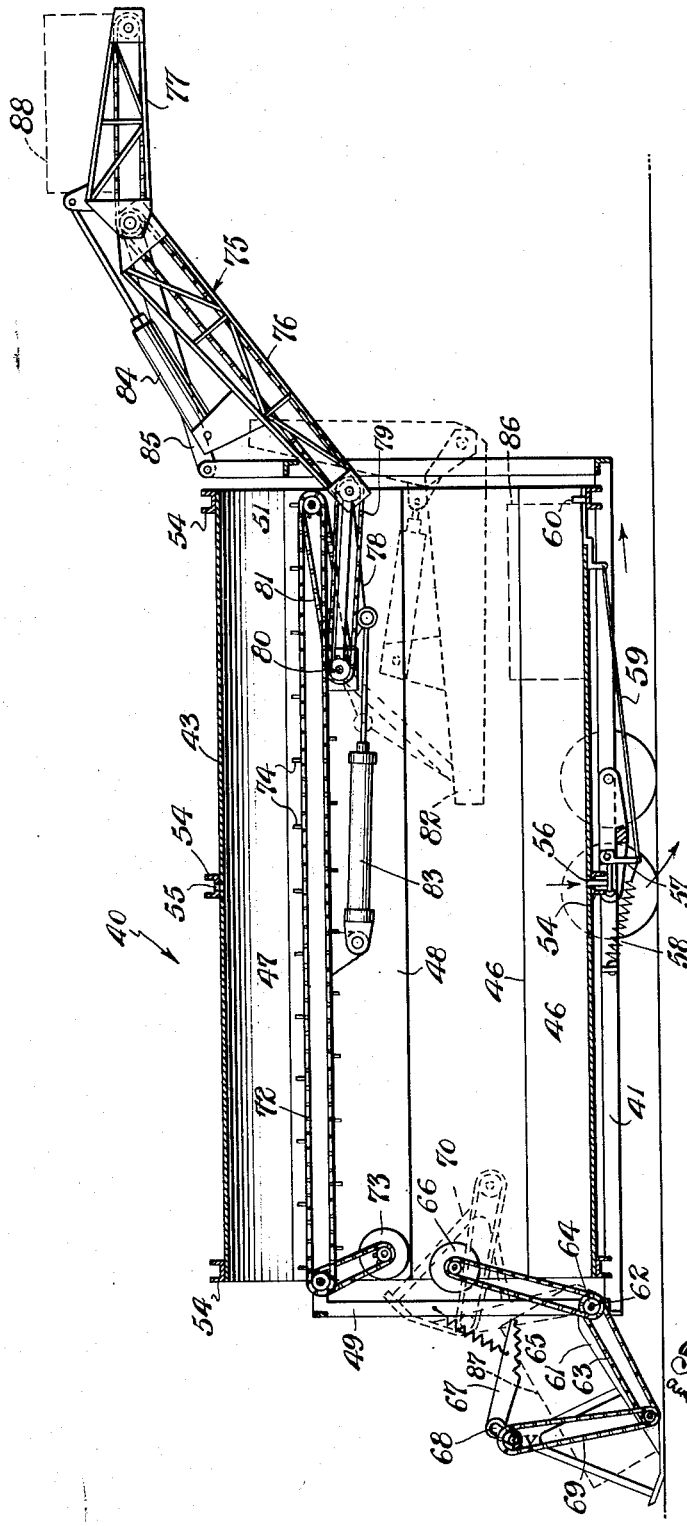
Figure 1 is a longitudinal sectional view of the invention.

Referring now to the accompanying drawings in detail, the bale wagon is designated generally by the reference numeral 40 and is adapted to be towed by a tractor or a truck and pick up bales from the ground, as well as to receive them from a baler. The wagon 40 comprises a wheeled chassis 41 provided at its front end with a laterally swingable draw bar 42 and carrying a horizontally elongated magazine or drum 43 which, in this instance, is mounted rotatably on the chassis, being supported on a set of rollers 44 carried by shafts 45 extending longitudinally of the chassis.

The drum 43 is provided therein with a plurality of partitions 46 extending longitudinally of the drum and separating the interior of its outer portion into a plurality of circumferentially arranged compartments 47 adapted to receive the bales of material therein as indicated at 85, there also being provided an inner drum section 48 in the outer drum 43 which coacts with the outer drum and the partitions 46 in defining the aforementioned compartments.

The inner drum section 48 is relatively stationary in the outer drum 43, being supported therein by the framework 49 of the chassis 41. The means for rotating the outer drum 43 and bringing the compartments 47 successively in alignment with the loading and unloading stations 50, 51, respectively, comprise a hydraulic motor 52 mounted on the framework 49 and operatively connected by suitable belt or chain drives 53 to the aforementioned shafts 45, whereby resultant rotation of the rollers 44 imparts rotation to the drum. The loading station 50 is located at the forward end of the lowermost compartment of the drum while the unloading station 51 is located at the rear end of the uppermost compartment, as is best shown in Figure 1.

The means for indexing or locking the outer drum 43 in predetermined positions wherein the respective loading and unloading stations are aligned with the respective lowermost and uppermost compartments comprise an annulus 54 which encircles the drum and is formed with a plurality of apertures 55 to receive a locking pin 56 provided on a double arm crank 57 pivoted to the chassis 41. The crank 57, controlled by a spring 58, is connected by a cable 59 to an actuating finger 60 slidably disposed in the rear end portion of the lowermost compartment, which finger is engaged by the bales deposited into that compartment as indicated at 86, and is also used to actuate a suitable valve for controlling the operation of the motor 52.

Power means are provided for loading and unloading the bales in and from the respective loading and unloading stations 50, 51, the loading means comprising a conveyor frame 61 vertically swingable upon a shaft 62 on the chassis 41, the frame 61 carrying an endless conveyor 63 driven from a sprocket 64 on the shaft 62 by a chain drive 65 from a hydraulic motor 66 on the chassis 41. Moreover, the frame 61 is equipped with a reciprocating bale pusher arm 67 actuated by a crankshaft 68 which, in turn, is driven from the conveyor 63 by a chain drive 69.

Thus, when the loading mechanism is in operation, bales are guided by projecting arms 61' of the frame 61 onto the conveyor 63 as shown at 87 and are then pushed by the arm 67 through the loading station 50 into the compartments of the drum.

In its operating position, the loading mechanism projects forwardly and downwardly from the loading station, but may be retracted into an inoperative position in the loading station as shown by the dotted lines 70 by simply swinging the frame 61 upwardly about the shaft 62. To facilitate lowering of the loading mechanism into its operative position, the draw bar 42 is swung laterally out of the way as shown in Figure 5, this being accomplished by a hydraulic cylinder 71 operatively connected to the draw bar.

The bale unloading mechanism comprises an endless conveyor 72 extending longitudinally along the bottom of the uppermost compartment of the drum 43 and driven by a hydraulic motor 73, the conveyor 72 having bale engaging slats or detents 74 provided only along approximately one-half its length so that when it is not in use, the relatively plain part of the conveyor may be disposed upwardly to prevent interference by the slats with circumferential movement of the bales when the drum is rotated.

The conveyor 72 feeds to an articulated conveyor unit 75 consisting of two hingedly connected sections 76, 77, the former being pivoted to a supporting beam 78 which, in turn, is swingably mounted in the inner drum section 48. The drive to the conveyor sections 76, 77 is taken through an endless chain 79 from a shaft 80 at the pivot point of the beam 78, the shaft 80, in turn, being driven by a chain 81 from the conveyor 72. A bale being discharged by the conveyor 77 is indicated at 83.

The operative position of the unloading conveyor is shown by full lines in Figure 1 and the inoperative position by the dotted lines 82, it being noted that in the latter position the conveyor sections 76, 77 as well as the beam 78 are retracted into the inner drum section 48. To facilitate folding and unfolding of the conveyor sections and the beam, hydraulic cylinders 83, 84 are provided, the former being attached to the drum section 48 and connected to the beam 78, while the latter extends between the conveyor sections 76, 77, as shown. A pair of carrier arms 85 are pivoted to the chassis framework 49 and to the pivoted connection between the conveyor sections 76, 77, so as to guide the folding and unfolding movement of the latter.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. A bale wagon comprising a wheeled chassis, a horizontally enlongated drum rotatably mounted on said chassis, longitudinal partitions provided in said drum and separating the interior thereof into a plurality of circumferentially arranged bale receiving compartments, a bale loading station provided at one end of the drum in communication with the lowermost compartment therein, a bale unloading station provided at the other end of the drum in communication with the uppermost compartment therein, means for rotating said drum for bringing said compartments successively in alignment with said loading and unloading stations, and bale actuated means provided in the lowermost compartment of the drum for automatically energizing and de-energizing said means for rotating the same.

2. The device as defined in claim 1 together with bale actuated means provided in said drum for locking the same in predetermined positions wherein the lowermost and uppermost compartments of the drum are aligned respectively with said loading and unloading stations.

3. The device as defined in claim 1 together with a projectable and retractable bale loading means provided at the loading station of said drum.

4. The device as defined in claim 1 together with a projectable and retractable bale unloading means provided at the unloading station of said drum.

5. The device as defined in claim 1 together with bale loading and bale unloading means provided at said loading and unloading stations respectively, said loading and unloading means being movable from outwardly projected operative positions to retracted inoperative positions within the drum.

References Cited in the file of this patent

UNITED STATES PATENTS

| | | |
|---|---|---|
| 847,451 | Wilmore | Mar. 19, 1907 |
| 1,434,504 | Schlafly | Nov. 7, 1922 |
| 1,656,501 | Rienks | Jan. 17, 1928 |
| 2,336,287 | Paxton et al. | Dec. 7, 1943 |
| 2,531,560 | De Wall | Nov. 28, 1950 |
| 2,702,131 | Leupke | Feb. 15, 1955 |